Feb. 10, 1970     A. S. BADGER ET AL     3,495,270
PORTABLE SEISMIC GALVANOMETRIC RECORDERS
Filed April 18, 1968
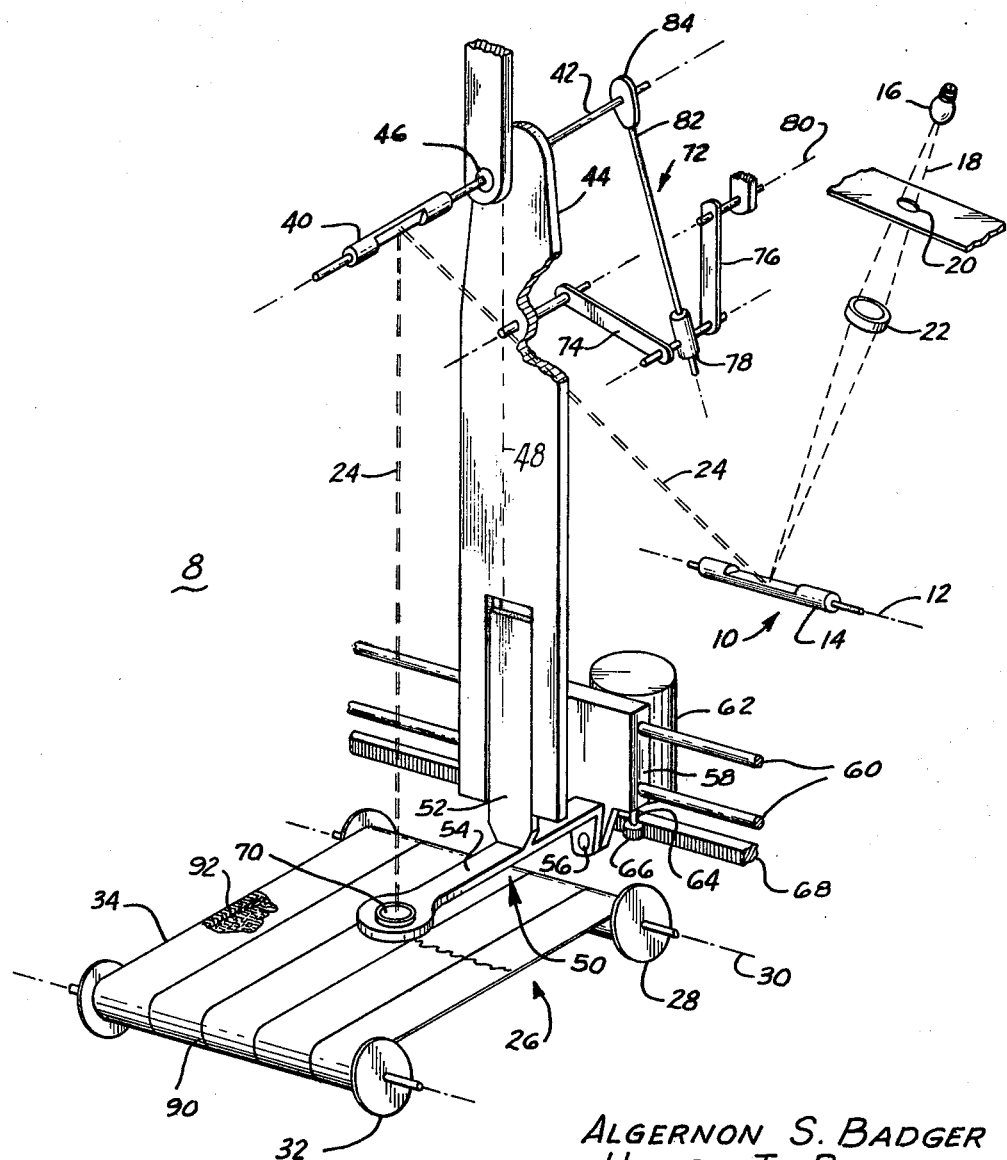
ALGERNON S. BADGER
HENRY T. RAY
OLIVER T. DIERLAM
                INVENTORS.
BY *Michael P. Breston*
                ATTORNEY

United States Patent Office 3,495,270
Patented Feb. 10, 1970

3,495,270
PORTABLE SEISMIC GALVANOMETRIC
RECORDERS
Algernon S. Badger, Henry T. Ray, and Oliver T. Dierlam, Houston, Tex., assignors to Geo Space Corporation, Houston, Tex., a corporation of Texas
Filed Apr. 18, 1968, Ser. No. 722,386
Int. Cl. G01d 9/42
U.S. Cl. 346—109                                 6 Claims

ABSTRACT OF THE DISCLOSURE

This invention relates to seismic galvanometric recorders of the type in which the recording medium is stationary during the recording cycle. An object light beam is reflected and rotated by a galvanometric mirror, in response to an input signal, to produce an image light beam. A rotatable scanning mirror reflects the image beam on a collimating lens. Driving means displace the collimating lens across the stationary recording medium. Linkage means coupled to the driving means cause both the rotation of the scanning mirror to be in synchronism with the displacement of the collimating lens and the recording medium to remain in the focal plane of the lens.

BACKGROUND OF THE INVENTION

In the past seismic information derived during geophysical prospecting was processed primarily with analog equipment. Analog processing allowed the viewing of seismic data soon after it was taken. Recently digital equipment and techniques have gained great acceptance in the processing of seismic data. However, the wide spread use of digital data processing has placed a relatively long time barrier between the taking of the field data and the availability of the digitally processed data.

It is a primray object of this invention to provide a portable seismic recorder or plotter which permits the field party to plot portions of the seismic sections in visual form. Thus, preliminary results become available soon after the data is taken. Based upon the visible results, necessary corrections can be made at the time of the taking of the raw data, instead of awaiting the results from a data processing center usually far removed from the field.

It is another object of this invention to provide a relatively simple to operate, dependable portable recorder for recording samples of data from each seismic shot on a recording medium.

It is a further object of this invention to provide a new and improved galvanometric recorder utilizing an elongated recording medium which is stationary during the recording cycle and on which the optical trace is recorded across the width dimension.

SUMMARY OF THE INVENTION

In accordance with this invention there is provided a small and compact galvanometric recorder. A scanning mirror, positioned in the path of the reflected beam from the galvanometer, projects the reflected beam on a collimating lens. Suitable driving means coupled to linkage means allow the collimating lens to become displaced across the width dimension of the recording medium in synchronism with the rotation of the scanning mirror. The linkage means include an extensible optical arm which allows the recording medium to continuously remain in the focal plane of the lens during the displacement of the lens.

The appended drawing partly in cross-section and partly diagrammatic, for the sake of clarity and simplicity of exposition, shows a now preferred embodiment of the novel features of the portable seismic recorder in accordance with the teachings of this invention.

DESCRIPTION OF PREFERRED EMBODIMENT

The seismic recorder, generally designated as 8, is designed for use in conjunction with the output electric signals from the various type transducers and/or amplifiers. The electrical signals may correspond to metered physical parameters, such as pressure, vibration, temperature, etc. In the seismic field the transducers are typically geophones and hydrophones. While the portable recorder 8 in practice includes four conventional D'Arsonval moving coil galvanometers, it will be apparent that more or less than four galvanometers can be used. Since each recording channel including a galvanometer works in the same manner, only one such channel is shown in the drawing for the sake of simplicity of exposition. Galvanometer 10 includes a rotatable shaft 12 to which is fixedly secured a reflecting mirror 14. Mirror 14 rotates as a function of the amplitude of an electric signal flowing through the coil of galvanometer 10. A suitable filament light source 16 fixedly positioned with respect to mirror 14 shines a beam of light 18, through a suitable aperture 20, unto a converging lens 22. Lens 22 converges the light beam 18 (object beam) unto mirror 14. The incident object beam 18 is reflected by mirror 14 into an image beam 24. It will be understood that in the absence of a change in the metered condition, that is in the current flowing through the coil of the galvnaometer, the image beam 24 is stationary.

In accordance with this invention it is desired to record the image beam 24 on a recording medium which is stationary while the beam is rotated. A suitable recording magazine, generally designated as 26, includes a drive spool 28 secured to a rotatable shaft 30. A feed spool 32 feeds the recording medium to the drive spool much like in a photographic camera. Shaft 30 can be rotated by an electric motor (not shown) or by hand. The recording medium may be a paper 34 known in the trade as Direct Write paper sold by Kodak. Such paper can be developed dry with ultra-violet light. On the other hand, when it is desired to make in the field several copies of the recorded information, conventional photographic paper may be used. The feed spool 32 accepts a roll of paper which may be 150 feet long on the regular four mil base or 200 feet long on the thin base type. The paper is 10 inches wide. Each seismic section is recorded on a nine inch wide strip, leaving a one half inch edge margin on either side of the paper. The plane of the paper between spools 28, 32 will hereinafter sometimes be referred to as the reference plane. The width dimension of paper 34 forms the X-axis and its length dimension forms the Y-axis of Cartesian coordinates.

A scanning mirror 40 is fixedly mounted on a shaft 42 in a plane substantially parallel to the reference plane. Rotatably mounted on shaft 42 is an extensible optical arm 44 which rotates freely on suitable bearings 46 about the axis of the shaft 42. A center line 48 intersecting the axis of shaft 42 is the trace of an optical plane perpendicular to the plane of the optical arm 44. While one end of optical arm 44 is rotatably mounted on shaft 42, the other end telescopically engages a drive link generally designated as 50.

Link 50 includes an engaging arm 52 telescopically mated with optical arm 44 and a support arm 54. The link 50 is pivotally mounted on a pivot 56 the longitudinal axis of which lies in the reference plane. Pivot 56 is carried by a carriage 58 which slides on a pair of parallel disposed rails 60. The carriage 58 is propelled on the rails 60 by an electric drive motor 62. Mounted on shaft 64 of motor 62 is a pinion 66 meshedly engaged with a stationary rack 68. Fixedly mounted in an opening in the support arm 54 is a collimating lens 70.

The image beam 24 from the galvanometer impinges on the scanning mirror 40 and is reflected on the center of the collimating lens 80 which focuses the image beam unto paper 34. In accordance with a feature of this invention the light path from the collimating lens 70 to the recording paper 34 remains constant while the collimating lens is carried across the width of paper 34. Since the light source 16 is stationary, it will be obvious from elementary optics that the scanning mirror 40 must rotate through one-half of the angle of rotation of the optical arm 44. This is accomplished by using a two-to-one angular reduction linkage between arm 44 and shaft 42. The reduction linkage is generally designated as 72 and includes two arms 74, 76. Arm 74 is pivotally mounted on optical arm 44 and on a sleeve 78. Arm 76 is pivotally mounted on sleeve 78 and on a fixed pivot 80. Sleve 78 is slideably mounted on a shaft 82 one end of which is fixedly secured to shaft 42 by a coupling plate 84. The length of arms 74 and 76 are selected to provide the desired two-to-one reduction between the angular rotation of optical arm 44 and scanning mirror 40.

In operation when drive motor 62 is energized, carriage 58 slides on rails 60. Linkage 50 causes both the rotation of optical arm 44 and the displacement of collimating lens 70. Since optical arm 44 and linkage 50 are telescopically engaged, the image beam 24 remains in the optical plane including trace 48, and the paper 34 remains at the focal point of collimating lens 70. Since the light path between the scanning mirror and the collimating lens varies, as a result of the extension of optical arm 44, it will now be appreciated why it is desirable, as previously mentioned, that the axis of pivot 56 be in the reference plane.

The optical trace can be plotted either from left to right or from right to left. A complete recording cycle includes a recording period during which the trace is recorded at about two inches per second. Thus, the recorder records 4.5 seconds of data, advances the paper and returns to a re-set position. The return speed is twice the record speed of four inches per second giving a total cycle time of about seven seconds. The recorder records ten traces per inch but only four traces (using four galvanometers) at one time. Thus, for each seismic shot the recorder provides seismic information or data, as shown at 92, which is displayed on a 0.4 inch paper strip. Assuming that a field crew conducts eight hours of seismic shooting at ten seconds per shot, the recorder would consume only 96 feet of paper. It will be appreciated that in practice certain timing lines in addition to the traces are produced in a conventional manner as by a crystal-controlled frequency signal driving a xenon flasher lamp. These timing lines 90 are typically recorded every 100 milliseconds. The line at the break line ($T=0$) and the lines for each second of record lengths are intensified and can be seen on the paper 34.

What we claim is:

1. In a galvanometric recorder having at least one channel which includes a galvanometer mirror for deflecting an object light beam in response to a metered condition, said recorder including:
   a rotatable shaft;
   a scanning mirror mounted on said shaft for rotation therewith;
   an optical arm rotatably mounted on said shaft;
   linkage means coupled between said optical arm and said shaft, said linkage means causing said shaft to rotate at an angle dependent on the angle of rotation of said optical arm; and
   drive means rotating said optical arm thereby causing said scanning mirror to rotate and to project the beam deflected from the galvanometric mirror onto a reference plane.

2. The recorder of claim 1 wherein said optical arm is extensible.

3. The recorder of claim 2 wherein said drive means include a support arm for carrying a collimating lens continuously in the path of the light beam projected by said scanning mirror onto said reference plane.

4. The recorder of claim 3 wherein said drive means telescopically engage said optical arm and further including:
   a recording medium positioned in said reference plane, said recording medium being stationary during the recording of said light beam.

5. The recorder of claim 4 wherein said recording medium is continuously at the focal point of said lens while said lens is carried across said recording medium by said support arm.

6. The recorder of claim 4 wherein said linkage means are selected to achieve a two-to-one reduction in the relative angular rotation between said optical arm and said shaft.

References Cited

UNITED STATES PATENTS

| | | | |
|---|---|---|---|
| 2,613,127 | 10/1952 | Geiser | 346—109 |
| 2,871,089 | 1/1959 | Loper et al. | 346—109 |

JOSEPH W. HARTARY, Primary Examiner